United States Patent
Ismert et al.

(10) Patent No.: US 7,854,337 B1
(45) Date of Patent: Dec. 21, 2010

(54) BREAKAWAY CLOSURE MEMBER WITH OFFSET NIPPLE

(75) Inventors: Joseph P. Ismert, Kansas City, MO (US); Dominic P. Ismert, Kansas City, MO (US)

(73) Assignee: Sioux Chief Mfg. Co., Inc., Peculiar, MO (US)

( * ) Notice: Subject to any disclaimer, the term of this patent is extended or adjusted under 35 U.S.C. 154(b) by 513 days.

(21) Appl. No.: 11/695,005

(22) Filed: Mar. 31, 2007

Related U.S. Application Data (63) Continuation-in-part of application No. 11/195,081, filed on Aug. 2, 2005, now Pat. No. 7,360,553.

(51) Int. Cl.
*H02G 3/08* (2006.01)
*H02G 3/18* (2006.01)
*B65D 6/40* (2006.01)

(52) U.S. Cl. .................. 220/3.2; 220/266; 174/666

(58) Field of Classification Search .............. 220/3.2, 220/3.8, 266; 215/249, 253; 174/666
See application file for complete search history.

(56) References Cited

U.S. PATENT DOCUMENTS

| | | | |
|---|---|---|---|
| 3,171,580 A * | 3/1965 | Davis et al. ............. 229/404 |
| 4,274,543 A * | 6/1981 | Braymer et al. ............. 215/6 |
| 4,863,049 A * | 9/1989 | Suzuki et al. ............. 215/249 |
| 5,114,030 A * | 5/1992 | Conard .................. 215/249 |
| 5,377,361 A * | 1/1995 | Piskula .................. 4/252.4 |
| 6,769,291 B1 | 8/2004 | Julian et al. |
| 7,360,553 B1 * | 4/2008 | Ismert .................. 137/360 |
| 2005/0138722 A1 * | 6/2005 | Humber ................. 4/252.1 |

* cited by examiner

*Primary Examiner*—Anthony Stashick
*Assistant Examiner*—James N Smalley
(74) *Attorney, Agent, or Firm*—Erickson, Kernell, Derusseau & Kleypas, LLC (57) ABSTRACT

A breakaway closure member for removably covering an opening in a plumbing device, such as a laundry box, pressure test cap, floor drain, shower drain, closet flange, or the like includes a circular disc with a peripheral rim and a hollow nipple extending outwardly from the circular disc. The peripheral rim is connected to the plumbing device by a thin web or area of reduced thickness. The nipple is radially outwardly offset from the center of the disc so as to be generally adjacent or tangent to the peripheral rim. If the nipple is radially compressed, such as by squeezing with a pair of pliers, the peripheral rim is pulled radially inward in an area proximate the nipple, thereby creating a crack in the area of reduced thickness.

4 Claims, 8 Drawing Sheets

BREAKAWAY CLOSURE MEMBER WITH OFFSET NIPPLE

This application is a continuation-in-part of application Ser. No. 11/195,081 filed Aug. 2, 2005.

BACKGROUND OF THE INVENTION

1. Field of the Invention

This invention relates to breakaway closure members or "knockouts" used to removably cover openings in plumbing devices, such as laundry boxes, pressure test plugs, and plumbing fittings, including but not limited to floor drains, shower drains and closet flanges. These knockouts may be used to cover an opening in the respective plumbing device until pressure testing of the associated plumbing system is completed after installation.

2. Description of the Related Art

Piping systems are used in structures to supply liquids and gasses and to-carry sewage and other wastes away. Common household piping or plumbing systems include water supply piping, drain piping, and possibly gas piping. Water supply pipes carry water from a water supply pipe to plumbing fixtures such as sinks, baths and showers, toilets, sprinkler systems, spigots, and the like. Drain piping carries human wastes, ground garbage from disposers, and waste water to sewers or septic tanks. Gas piping, if present, carries fuel gases such as natural gas or propane gas to appliances such as furnaces, ranges, gas fireplaces, and the like. A particularly necessary quality of all types of piping is integrity of the pipes and joints such that the liquids or gases carried do not leak.

In order to ensure that a piping system does not leak, pressure testing is often conducted and may be required by some local codes. Plumbing is preferably installed, tested, and joints repaired, as needed, prior to closing access to the piping and joints by the installation of wallboards. Testing often involves pressurizing the piping system with compressed air, or alternatively filling it with water, and detecting any leaks. Testing is usually done before any fixtures, appliances, or the like have been connected to the piping system.

Plastics, such as PVC (polyvinyl chloride), ABS (acrylonitrile-butadiene-styrene) and others, are used in many types of plumbing, including waste plumbing. It is common practice, during testing, to install removable test plugs or caps on pipe stubs to which fixtures, such as toilets, will be subsequently connected. After testing is completed, the caps are removed. The test caps need to be sealed in place such that they do not leak during testing. When the test caps are no longer needed, they need to be removed in such a manner that the test cap is not lost in the waste plumbing, such that the remaining plumbing is not damaged by removal of the test cap, and such that no remaining parts of the test cap assembly interfere with the fixture to be installed. Additional features which would be desirable in such a test cap include the capability of conveniently connecting a source of pressurized fluid to the cap for conveniently testing that the piping system is pressurized.

U.S. Pat. No. 6,769,291 to Julian et al., entitled Knock-Out Pressure Test Cap With Breakaway Nipple Plug discloses a test cap for connection to a pipe. The cap includes a mounting collar and a closure disc which seals the mounting collar. The closure disc is connected to the collar through an inner rim by a weakened ring. An outer rim section registers with the inner rim so that impacts to the outer rim are transferred to the weakened ring to separate the disc from the collar. The closure disc includes a centrally positioned nipple for connection of a conduit of a pressurized test fluid source. The nipple is closed by a break-away nipple plug.

In certain applications, such as inside of laundry boxes where space to swing a hammer is limited, it may be difficult to impact the outer rim of a knockout as disclosed by Julian et al. sufficiently to break the weakened ring. In addition, connection of a conduit to provide pressurized fluid to a centrally located nipple inside a laundry box may be difficult. It is, therefore desirable to provide a breakaway closure member with an improved nipple configuration and removal means.

SUMMARY OF THE INVENTION

The present invention is breakaway closure member or "knockout" for a plumbing device. In the embodiment shown, the knockout is disclosed as part of a modular utility box system and removably covering a drain opening therein. The knockout includes a circular closure disc having a peripheral rim and a hollow nipple extending longitudinally outward from the circular disc along a nipple axis radially outwardly offset from the central axis of the disc and adjacent or generally tangent to the peripheral rim.

The nipple is preferably initially sealed with a removable nipple plug. The plug may be removed and a conduit connected to the nipple to fill the drain line with pressurized fluid for pressure testing. An area of reduced thickness or weakened ring connects the peripheral rim to a pipe stop positioned in the drain opening. After pressure testing is complete, radially compressing the hollow nipple, such as by squeezing it with a pair of pliers, will draw a portion of said peripheral rim radially inward, thereby forming a crack in the weakened ring proximate to the nipple. Once the breaking of the weakened ring has begun, the remainder of the weakened ring is easily broken by pulling upwardly on the nipple with the pliers until the closure member breaks loose from the laundry box. In laundry box applications, the nipple is preferably located near the front of the box to facilitate connection of a conduit carrying pressurized fluid for pressure testing.

The closure member of the present invention can be used in applications other than laundry boxes, including pressure test plugs similar to the one disclosed in U.S. Pat. No. 6,769,291, in plumbing fittings, such as floor drains, shower drains and closet flanges, and in virtually any plumbing device where a knockout closure member can be utilized.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1:
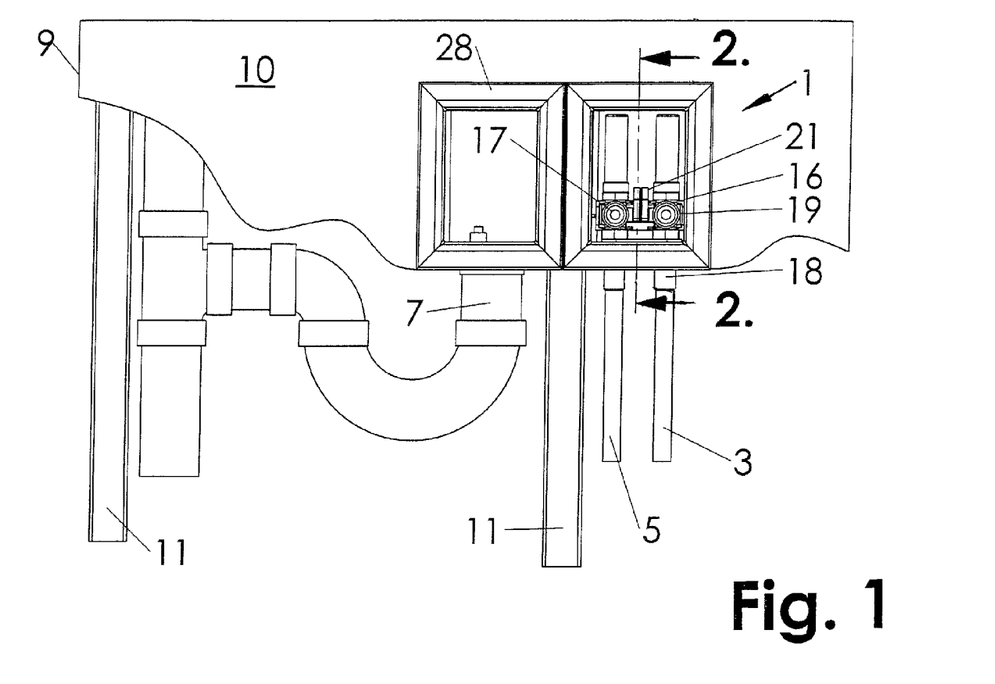
FIG. 1 is a fragmentary front plan view of a modular utility box system installed in a wall with portions of the wall removed to show water supply and drain lines connected to the system for subsequent connection to a washing machine water supply and drain lines.
Figures 3, 4, 5:
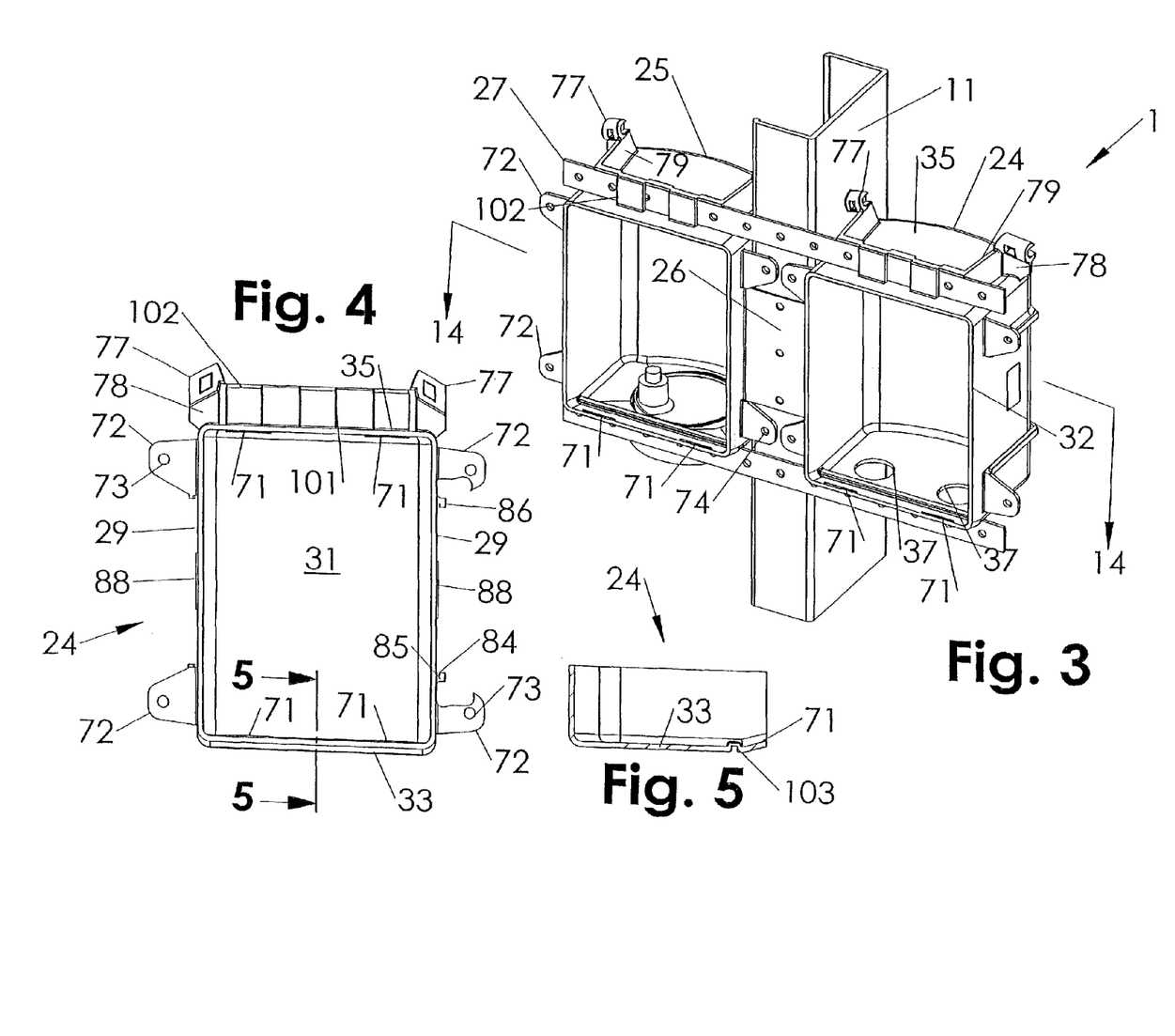
FIG. 3 is a perspective view of portions of the modular utility box system including a supply box and a drain box secured on opposite sides of a stud prior to installation of wallboard to the studs and a cover plate over the boxes.
FIG. 4 is an enlarged front plan view of the supply box shown in FIG. 3.
FIG. 5 is an enlarged and fragmentary cross-sectional view of the supply box taken along line 5-5 of FIG. 4.

Referring to the drawings in more detail, the reference number 1 generally designates a modular utility or laundry box system. As shown in FIGS. 1 and 3, the system 1 is used to provide access to hot and cold water supply lines 3 and 5, respectively, and to a drain line 7 located in a wall 9 in order to allow connection of a washing machine (not shown). The wall 9 is expected to be constructed in the traditional fashion with wallboard 10 fastened to spaced apart wall studs 11, including wood or metal studs 11. As discussed in more detail hereafter, the laundry box system 1 allows ready and removable connection of washing machine hot and cold water supply lines (not shown) to the supply lines 3 and 5 and insertion of a washing machine drain hose into the drain line 7 mounted in the wall 9. However, it is to be understood that the system could be used in association with other water supply and drain line systems including water supply lines for refrigerator/freezers and other appliances which may only utilize a single water supply line.

The washing machine water supply lines may be connected to the supply lines 3 and 5 in wall 9 using connector assemblies or hookups 16 and 17. Each hookup 16 and 17 includes first and second connectors 18 and 19 which are mounted on opposite sides of a shut-off valve 20. Each of the wall mounted water supply lines 3 and 5 are connected to a respective first connector 18 and the washing machine water supply lines 13 and 14 (not shown) are connected to a respective second connector 19. The shut-off valves 20 may both be operated by a single valve actuator 21 or by separate actuators (not shown). Each of the hookups 16 and 17 may further include a water hammer arrester 22. The connector assemblies or hookups 16 and 17 may be considered as forming a portion of a respective water supply line 3 or 5 and may also be considered part of the laundry box system 1.

Referring to FIG. 3, showing a portion of the system 1 mounted on a stud 11 prior to installation of the wall board 10 and without the hookups 16 and 17, the laundry box system 1 includes a supply box 24 and a drain box 25. The supply box 24 and drain box 25 may be mounted separately on one or more studs 11 or, as shown in FIG. 3, the boxes 24 and 25 may be connected together and mounted to a stud 11 using one or more U-shaped clips 26 or elongate brackets 27, or other mounting structure and combinations thereof. The boxes 24 and 25 are preferably molded from high impact plastic, such as PVC (polyvinyl chloride) or ABS (acrylonitrile-butadiene-styrene). In general practice, once the boxes 24 and 25 are mounted in a stud wall 9, wallboard 10 with a hole cut to receive the boxes 24 and 25 is secured to the studs 11. A cover plate 28 (see FIGS. 1 and 2) is then secured to the boxes 24 and 25 providing access to the interiors thereof and covering the gaps between the outer edges of the boxes 24 and 25 and the edge of the hole in the wallboard 10. As used herein, reference to the front of the boxes 24 and 25 is to the side of the boxes to which the cover plate 28 is attached as generally shown in FIG. 2 and which are open to provide access to the interior of the boxes.

Figure 2:
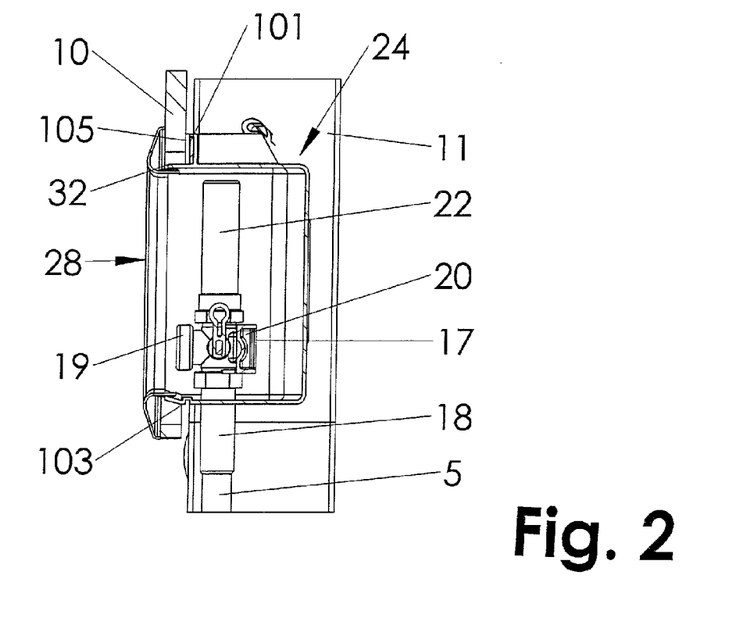
FIG. 2 is an enlarged and fragmentary view taken along line 2-2 of FIG. 1 showing a supply box of the system secured in the wall.

Referring to FIGS. 2-5, the supply box 24 includes a pair of side walls 29, a rear wall 31, an open front side or face 32 and opposed first and second end walls 33 and 35, respectively. The first end wall 33 includes a pair of spaced apart supply line openings 37 each being sized to receive the first connector 18 of the associated hook-ups 16 and 17, which may be, for example, ½" NPS male threaded pipe connections. The hook-ups are shown in FIGS. 1 and 2, but not 3-5. The openings 37 are preferably aligned with each other along a centerline parallel to the front edge of the first end wall 33. The hook-ups 16 and 17 may each be secured to the supply box 24 by inserting the respective connector 18 through the respective opening 37 and threading a nut 38 onto the connector 18 from outside the box 24 and tightening it against the outer surface of the first end wall 33. The overall size of the supply box 24 is selected so as to provide sufficient room for the shut-off valves 20 and water hammer arresters 22 to be mounted therein and provide hand access to the shut-off valves 20. It should be noted that the supply box 24 is fully reversible such that the first end wall 33 with its supply line openings 37 may be oriented either downwardly as in FIGS.

Figure 15:
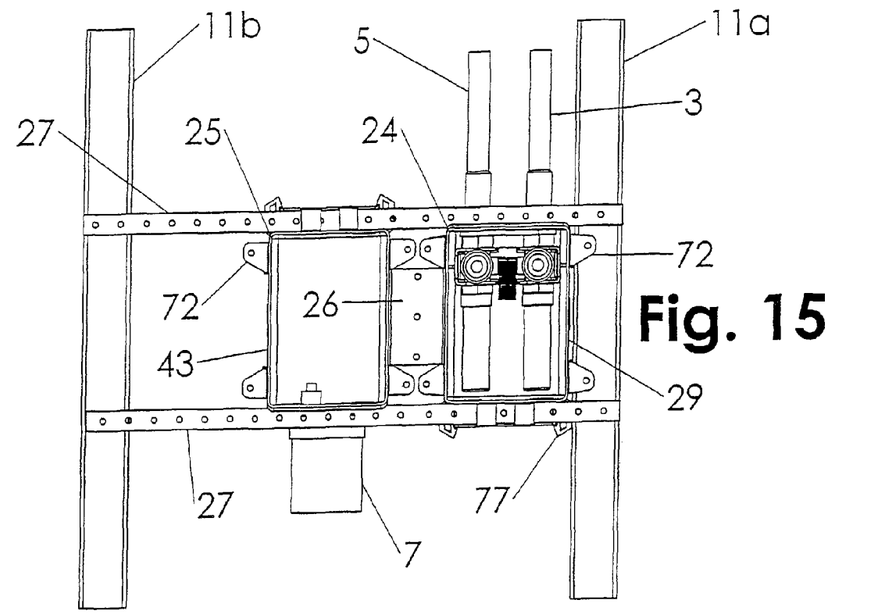
FIG. 15 is a fragmentary front plan view showing an alternative mounting arrangement wherein the supply and drain box are mounted between two studs with one of the boxes abutting against one of the studs and with the supply box inverted to permit connection to supply lines plumbed above the supply box.

2-5 or upwardly as in FIG. 15. The supply box 24 does not include any openings sized for coupling with or connection to the drain line 7.

Figure 6:
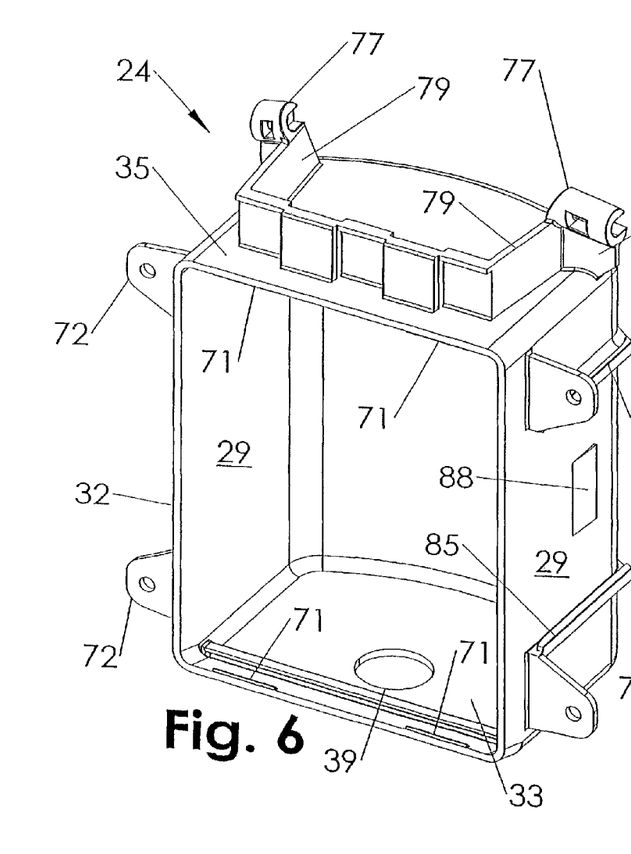
FIG. 6 is a perspective view of a supply box adapted for use in providing access to a hookup for a single water supply line such as may be used to supply water to an ice maker.

If it is desired that the supply box 24 be useable as an ice-maker supply box, a single supply line opening 39 may be provided generally centrally in the first end wall 33 of the supply box 24, as shown in the alternative embodiment of FIG. 6. The single supply line opening 39 is sized to receive a single hook-up (not shown) for an ice-maker or the like. It is also foreseen that the supply box 24 may be modified to include three or more supply line openings such as openings 37 and 39 to facilitate use of the supply box 24 for multiple applications including as a supply box for laundry supply line hook-ups or for an ice-maker supply line hook-up. The openings, such as openings 37 and 39 may be initially covered by respective knockouts (not shown) which could then be selectively removed depending on whether the supply box 24 is to be used with one or two hook-ups.

Referring to FIGS. 7-10, the drain box 25 includes a pair of side walls 43, a rear wall 45, an open front side 46, a top end wall 47 and a bottom end wall 49. The bottom end wall 49 includes a drain line opening or bore 51 sized to receive the drain line 7, which may be, for example, 2" PVC or ABS pipe. The drain line 7 and drain line opening 51 are sized to receive a washing machine drain hose (not shown) from a washing machine. Washing machine drain hoses typically have outside diameters from 0.875 inches to 1.15 inches, or radiuses of 0.438" to 0.575". The drain box 25 does not include any openings sized to receive the supply lines 11. The bottom end wall 49 slopes downwardly from all sides toward the drain line opening 51 to funnel any water spilled or leaking into the drain box 25 from the washing machine drain line 15.

Figure 9:
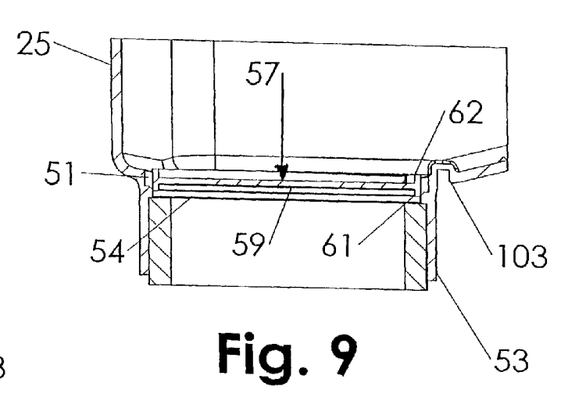
FIG. 9 is an enlarged and fragmentary cross-sectional view of the drain box taken along line 9-9 of FIG. 8.

As best seen in FIG. 9, a sleeve or collar 53 sized to accept the drain line 7 extends downward from the bottom end wall 49 around the drain line opening 51. The drain line 7 can be attached to the collar 53 by use of a cement or other adhesive. A pipe stop 54 projects radially inward from the collar 53 and forms a shoulder or stop which abuts against an upper end of a drain line 7 received within collar 53. The inner diameter of the drain line 7 is generally smaller than the inner diameter of the pipe stop 54. It is foreseen that the collar 53 could be inserted inside of a larger diameter drain line 7. When the drain line 7 is inserted into or over the collar 53, the collar 53 may be described as extending in axial alignment with the drain line 7.

A removable closure member or knockout 57 initially covers the drain line opening 51 and permits pressure testing of the drain line 7. The closure member 57 can be removed after pressure testing to permit insertion of the washing machine drain hose (not shown) into the drain line 7. Portions of the closure member 57 are similar in construction to the closure member or disk described in U.S. Pat. No. 6,769,291 of Julian et al. the disclosure of which is hereby incorporated by reference.

Figure 10:
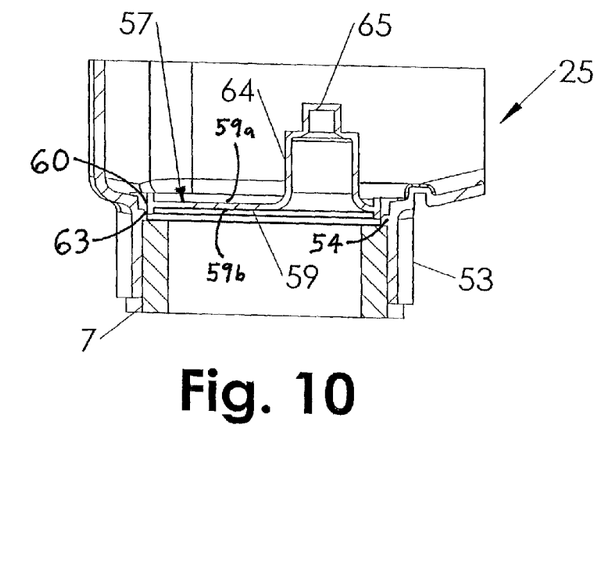
FIG. 10 is an enlarged and fragmentary cross-sectional view of the drain box taken along line 10-10 of FIG. 8.

Referring to FIGS. 9 and 10, the closure member 57 includes a circular disc or wall 59 with an outer surface 59a, an inner surface 59b, and a peripheral rim 60 formed along a peripheral edge of the circular disc 59. The rim 60 includes an inner rim section 61 and an outer rim section 62. The inner rim section 61 extends inwardly (or downwardly in the drawings) from the inner surface 59b of the disc 59 and the outer rim section 62 extends outwardly (or upwardly in the drawings) from the outer surface 59a. A lower outer edge of the inner rim section 61 is connected to the upper inner edge of the pipe stop 54 by a weakened ring or region of reduced thickness 63 to allow shearing of the inner rim section 61 from the pipe stop 54 upon application of a shearing force to the removable closure member 57. The outer diameter of the closure member 57 is preferably sized to be larger than the inner diameter of the drain line 7 received within the collar 53 so that the closure member 57 will not fall into the drain line 7 when removed from the drain box 25.

Figure 7:
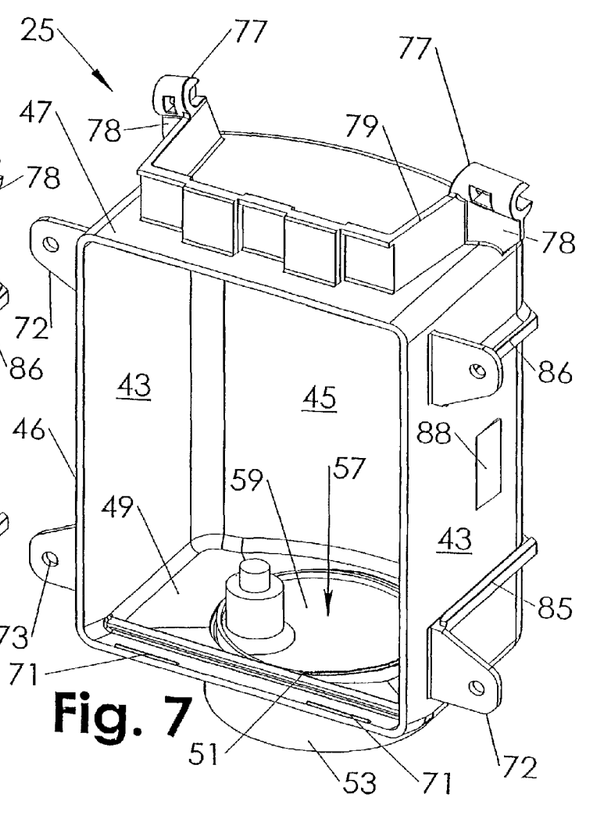
FIG. 7 is a perspective view of the drain box shown in FIG. 3.

With reference to FIGS. 7 and 10, a hollow nipple 64 is formed in the circular disc 59 and opens through the circular disc 59. A breakaway nipple plug 65 of reduced diameter is connected to the nipple 64 by a weakened ring to facilitate separation of the nipple plug 65 from the nipple 64. The nipple 64 and nipple plug 65 are preferably cylindrical in shape, but other geometries may be utilized. Until removed, the nipple plug 64 covers an opening in the outer end of the nipple 64. The nipple 64, with the nipple plug 65 removed, provides structure for connecting a conduit (not shown) thereto. The conduit may then be used to deliver pressurized fluid to the drain line system for pressure testing. The nipple 64 and nipple plug 65 are shown as being positioned on a nipple axis N radially offset from a center axis C of the disc 59 toward the front thereof to facilitate access to the nipple 64.

Figure 17:
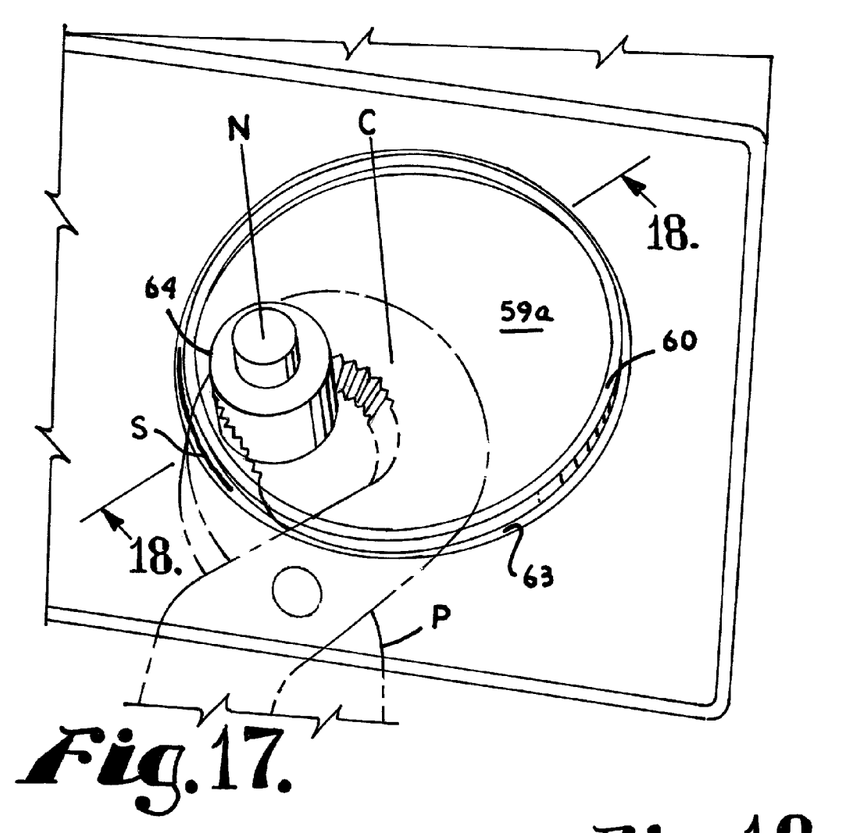
FIG. 17 is a fragmentary perspective view of a bottom wall of the drain box showing removal of a breakaway closure member by compressing an offset nipple.
Figure 18:
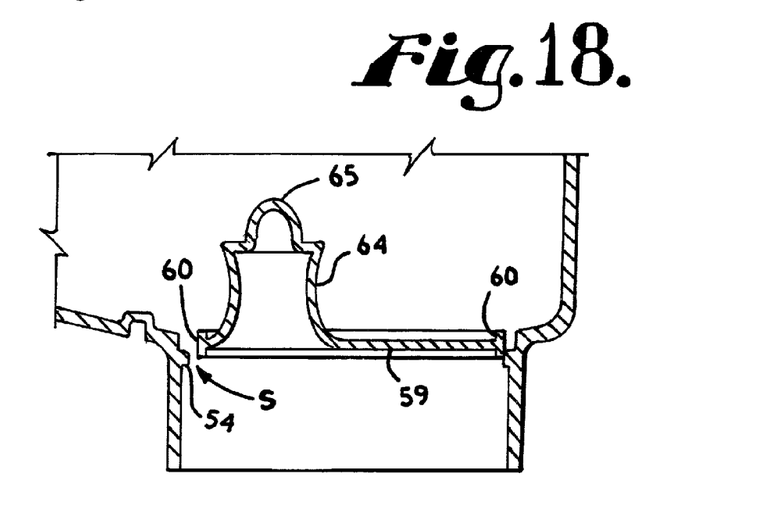
FIG. 18 is an enlarged and fragmentary cross-sectional view of the drain box taken along line 18-18 of FIG. 17.

Referring to FIGS. 17 and 18, it has been found that when the hollow nipple 64 is positioned in closely spaced relation to the region of reduced thickness 63, or generally tangent to the outer rim section 62, the closure member 57 can be easily broken away from the drain line opening 51 by gripping the nipple 64 with a pair of pliers, such as groove joint pliers P, and squeezing so as to compress the walls of the nipple 64 radially inward. When the nipple 64 is compressed, a portion of the peripheral rim 60 proximate the nipple 64 is also pulled radially inward, thereby breaking the weakened ring 63 in the area where the peripheral rim 60 and nipple 64 are closest. A crack or split S is thus started in the weakened ring 63. Once the breaking of the weakened ring 63 has begun, the remainder of the weakened ring 63 is easily broken by pulling upwardly on the nipple 64 with the pliers until the closure member 57 breaks loose from the drain box 25.

If there is sufficient clearance to swing a hammer or the like, it is also possible to separate the closure member 57 from the pipe stop 54 by pounding on the outer rim section 62. The rim 60 functions to hold the closure member 57 in a single piece so that it cannot fragment and fall through the drain line opening 51.

Figure 11:
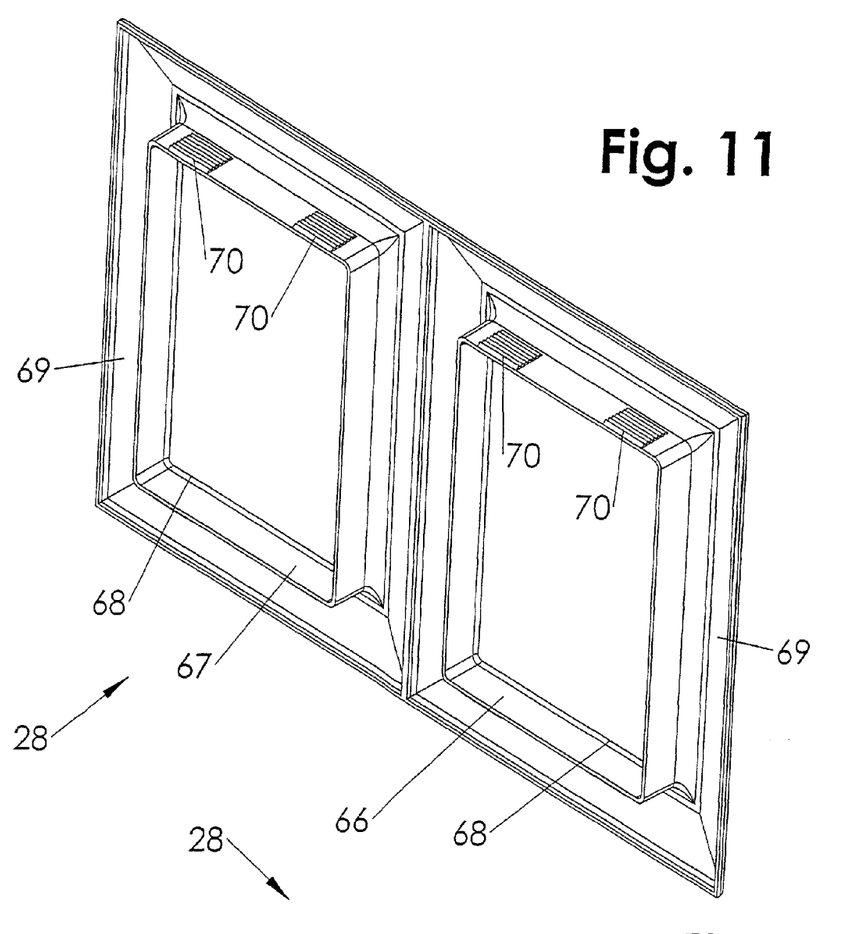
FIG. 11 is a rear perspective view of a cover plate for the supply and drain boxes when connected together as in the manner shown in FIG. 3.
Figure 12:
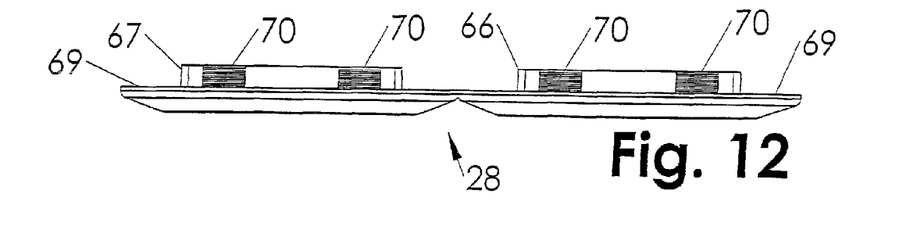
FIG. 12 is a bottom plan view of the cover plate.

Referring to FIGS. 11 and 12, the cover plate 28 generally comprises a pair of interconnected cover plates or frames adapted to provide access to the interior of the boxes 24 and 25 and cover the edges thereof. Cover plate 28 includes first and second frame collars or sleeves 66 and 67 each defining a frame opening 68. A flange or fascia 69 extends outward around the periphery of each frame collar 66 and 67. The portion of the fascia 69 extending between the collars 66 and 67 are interconnected to form a unitary piece. The frame collars 66 and 67 are sized and spaced to fit through the front face 32 and 46 and into the interior of an aligned and interconnected pair of boxes 24 and 25 mounted in the proper spacing and alignment such as by clip 26.

Figure 8:
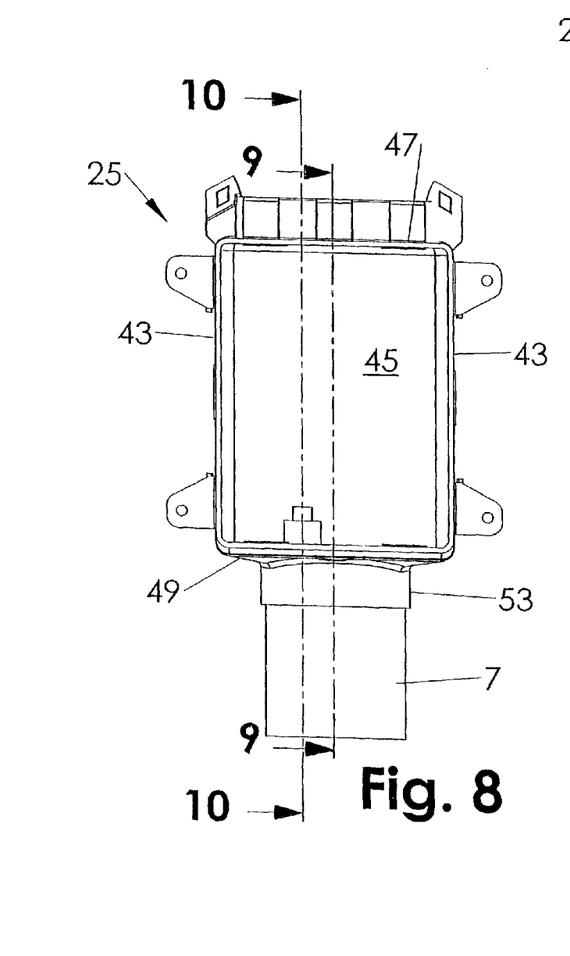
FIG. 8 is an enlarged front plan view of the drain box shown in FIG. 7.

A pair of ratchet strips 70 are formed on both the upper and lower, outer surfaces of each collar 66 and 67. As best seen in FIGS. 4 and 8, corresponding pawls 72 are formed along the front edge of the end walls 33, 35, 47 and 49 of each supply box 24 and drain box 25. The pawls 71 along the front edges of the boxes engage the aligned ratchet strips 70 to secure the cover plate 28 to the boxes 24 and 25. It is foreseen that separate cover plates will be provided where it is desired to use only a single box 24 or 25 or if the installer would prefer to install separate covers over each box 24 and 25 even when properly aligned. It is also foreseen that the cover plate 28 could be formed to facilitate separation of the two frame sections into separate frame sections if desired. However, it is believed that a single cover plate 28 with two frame openings 68 will provide a more uniform appearance and will be preferred.

Each of the boxes 24 and 25 includes a variety of structures to facilitate mounting of the boxes 24 and 25 in a wall 9 including the U-shaped clips 26 and the elongated brackets or bars 27 which permit mounting of the boxes 24 and 25 in various arrangements or configurations, including on the same or opposite sides of a stud 11 and with the supply box 24 oriented with the first end wall 33 (in which the supply line openings 37 are formed) positioned as the bottom end wall or the top end wall.

Referring to FIGS. 3, 4 and 8, four mounting flanges 72 are formed on and project radially outward from the sidewalls 29 and 43 of the supply box 24 and drain box 25 respectively, near the corners thereof. The mounting flanges 72 are spaced rearwardly from a front edge of the respective boxes 24 and 25 a distance approximately equal to the thickness of the wallboard 10. Each of the mounting flanges 72 includes at least one fastener receiving hole 73 sized to receive a fastener 74, such as a nail or screw. Fasteners 74 can then be driven through the fastener receiving holes 73 of the mounting flanges 72 on one of the sidewalls 29 or 43 of either the supply box 24 or drain box 25 and into the front face of a stud 11 to connect the respective box to the stud 11.

A pair of hollow, cylindrical, fastener guides 77 are mounted to and above both the second end wall 35 of the supply box 24 and the top end wall 47 of the drain box 25, with one fastener guide 77 positioned proximate each sidewall of the pairs of sidewalls 29 and 43. When, for example, the supply box 24 is positioned with one of its sidewalls 29 against a side of a stud 11 and the mounting flanges 72 projecting outward from that sidewall 29 are secured to the front of the stud 11, another fastener can be driven through the fastener guide 77 associated with the respective sidewall 29 and into the side of the stud 11 to provide lateral or side to side support for the supply box 24. Each fastener guide 77 is mounted to the associated end wall 35 or 47 by web 78 and support wall 79 at an angle to facilitate driving a fastener into the stud 11 at a selected angle.

Figure 13:
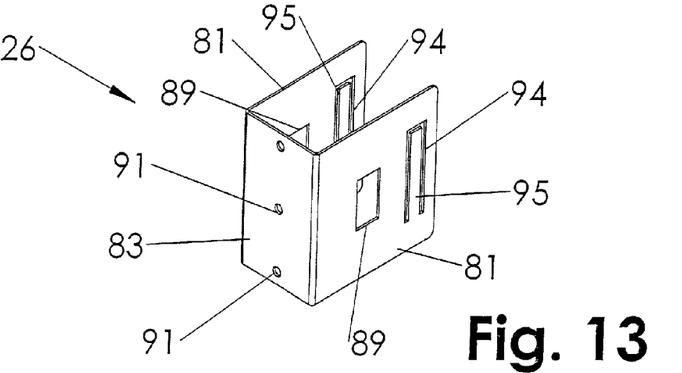
FIG. 13 is a perspective view of a clip used to connect the supply box to the drain box in the manner shown in FIG. 3.

The U-shaped clips 26, one of which is shown in FIG. 13, are adapted for connecting a supply box 24 to a drain box 25 in the proper spacing and spacial alignment to facilitate the subsequent attachment of a cover plate 28 to the interconnected boxes 24 and 25. The U-shaped clips 26 are also configured to facilitate securing the boxes 24 and 25 on opposite sides of a stud 11. Each U-shaped clip 26 includes a pair of ears or legs 81 projecting rearward from and connected together by a front plate or intermediate connecting member 83. The front plate 83 spaces the legs 81 apart a sufficient distance to receive the narrow dimension of one of the studs 11 therebetween and to provide the proper spacing between boxes 24 and 25, connected together by the clip 26, to facilitate connection of the cover plate 28 thereto.

The legs 81 are sized to be received in slots 84 formed in the sidewalls 29 and 43 of the boxes 24 and 25 respectively. As can be seen in FIGS. 3, 4 and 8, each slot 84 is formed by a pair of channel members or L-shaped guides 85 and 86 formed on the outer surface of each of the sidewalls 29 and 43 in vertically spaced and parallel alignment. A wedge shaped catch 88 is formed on the outer surface of each sidewall 29 and 43 between the L-shaped guides 85 and 86. A catch receiving hole 89 is formed in each leg 81 of clip 26. The catch 88 extends into the hole 89 of a leg 81 when the leg 81 is inserted into a slot 84 to the desired depth, where the clip front plate 83 generally extends flush with the mounting flanges 72.

Figure 14:
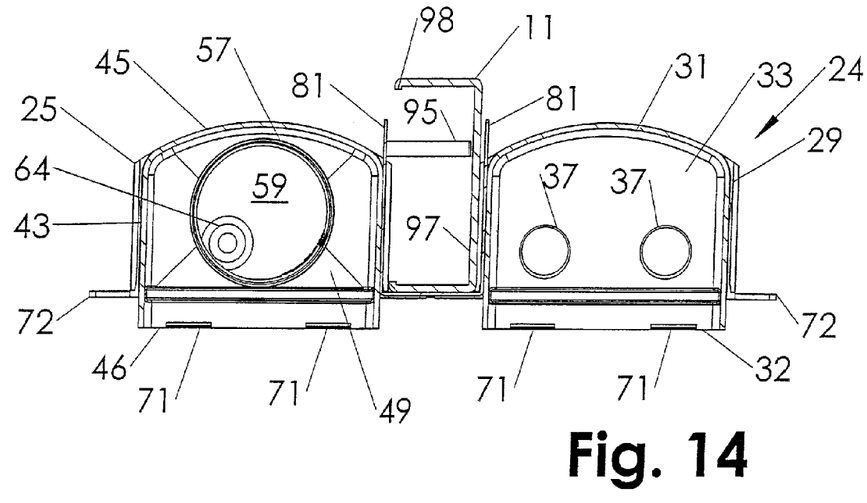
FIG. 14 is a cross-sectional view taken generally along line 14-14 of FIG. 3 showing a brace of the clip bent 90 degrees and into engagement with an interior surface of a C-shaped metal stud to which the clip is attached.

As noted previously, the legs 81 are spaced apart a distance sufficient to receive the narrow dimension of a stud 11 therebetween. One or more fastener receiving holes 91 are formed in the clip front plate 83 to facilitate mounting of the clip 26 to the front face of a stud 11. As shown in FIGS. 3 and 14, with a supply box 24 mounted on one leg 81 of a clip 26 and a drain box 25 mounted on the other leg 81, the clip 26 can be advanced over a stud 11 and then secured in place by driving one or more fasteners through the fastener receiving holes 91 in the clip front plate 26. Fasteners can then be driven through the appropriate mounting flanges 72 and nail guides 77 to further secure the boxes 24 and 25 in place on opposite sides of the stud 11.

The clip 26, is sized to space the vertical edges of the sidewalls 29 and 43 farthest from the stud 11 the proper distance apart to align the edges of the boxes 24 and 25 with the first and second frame collars 66 and 67 of cover plate 28. The L-shaped guides 85 and 86 are also positioned on the sidewalls 29 and 43 to position the pawls 71 formed along the front edge of the drain box top end wall 47 in horizontal alignment with the pawls 71 formed along the front edge of either the first or second end wall 33 or 35 of the supply box 24 (depending on which of the endwalls 33 or 35 is positioned on top) when the boxes 24 and 25 are secured together by the clip 26. The clip 26 thereby ensures that the pawls 71 will be properly aligned with the ratchet strips 70 on each of the cover plate collars 66 and 67.

Referring again to FIG. 13, a U-shaped channel 94 is punched into each leg 81 of the clip 26 to form a selectively engageable strut or brace 95. The braces 95 are adapted for use when the clip 26 is used in association with metal studs 11 having a C our U shaped cross-section. As can be seen in FIG. 14, such metal studs 11 have a web 97 on one side and an open channel 98 on the other. When the clip 26 is attached to the face of the metal stud, the brace 95 on the open channel side can be bent 90 degrees inward to position the tip of the brace 95 against an inner surface of the web 97. The brace 95 so deployed provides lateral support for the clip 26 and the box 24 or 25 mounted to the associated leg 81.

Figure 16:
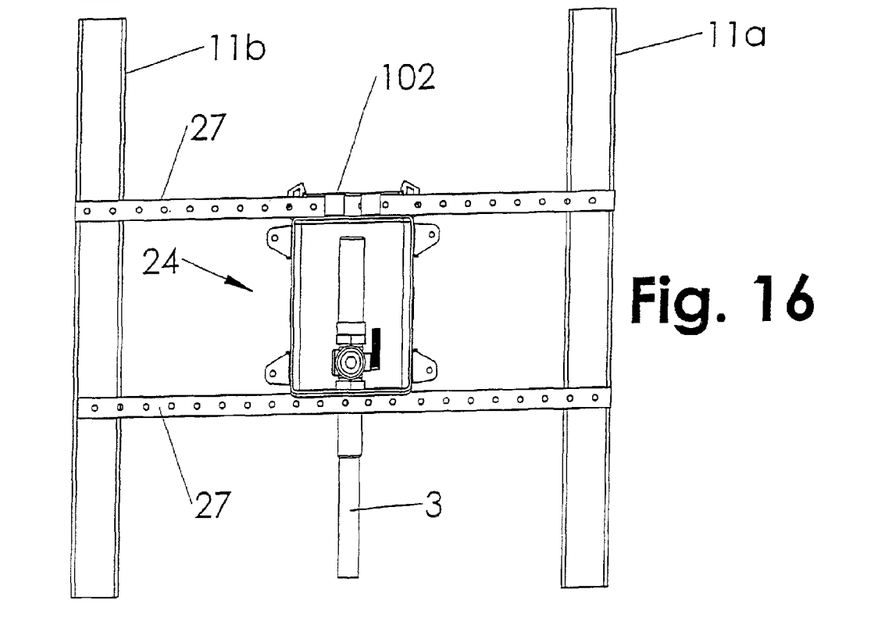
FIG. 16 is a fragmentary front plan view showing another alternative mounting arrangement wherein a single box is mounted between two studs without abutting against either stud.

As shown in FIGS. 3, 15 and 16, elongated mounting brackets 27 may be connected to one or more of the boxes 24 and 25 through a set of apertures or slots 101 and grooves 103 formed in the boxes 24 and 25. The mounting bracket 27 shown is of the type generally referred to in the industry as a Hyco Bar and comprises an elongate, relatively rigid metal bar with equally spaced fastener receiving holes extending along its entire length. The mounting brackets 27 may be used to make the connection of the boxes 24 and 25 over a stud more rigid or to support boxes 24 and 25 individually or in combination between a pair of adjacent studs 11.

With reference to FIGS. 2 and 3, slots 101 are formed in a slotted wall or flange 102 projecting outward and transverse to the supply box second end wall 35 (the wall opposite the supply line openings), and the drain box top end wall 47. The slotted flanges 102 are spaced rearward from the front edge of the end walls 35 and 47 a distance generally corresponding to the thickness of the wallboard 10. A mounting bracket 27 can be threaded through aligned slots 101 in adjacent boxes 24 and 25 to connect the boxes 24 and 25 together in the proper vertical alignment without use of the clip 26. However, use of the clip 26 is preferred to facilitate maintaining the proper horizontal spacing of the boxes 24 and 25. Because the mounting brackets 27 extend through the slots 101 on edge, the mounting brackets 27 resist vertical deflection of the boxes 24 and 25 even upon application of large downwardly directed forces which may be applied to the top of the boxes 24 and 25 if the wallboard 10 to be applied is supported on either of the boxes 24 or 25.

Grooves 103 are formed in the drain box bottom end wall 49 (see FIG. 9) and the supply box first end wall 33 (see FIGS. 2 and 5). The grooves 103 extend inward from the outer surfaces of end walls 33 and 49 and extend across the width of the boxes 24 and 25 parallel to the front edges thereof. The grooves 103 are spaced rearward from the front edges of the end walls 33 and 49 the same distance that the slots 101 are spaced rearward from the front edges of end walls 35 and 47. An elongate bracket 27 may be inserted into or threaded through aligned grooves 103 in aligned boxes 24 and 25 to support the boxes 24 and 25 as generally shown in FIGS. 3, 15 and 16.

In applications in which the supply box 24 is inverted to position the first end wall 33 and the supply line openings 37 on top or above the second end wall 35 as shown in FIG. 15, the groove 103 in the supply box first end wall 33 will be aligned with the slot 101 formed above drain box top end wall 47. Correspondingly, the slot 101 in the supply box second end wall 35 will be aligned with the groove 103 formed in the bottom end wall 49. It is foreseen that the slots 101 and grooves 103 could be sized or arranged to receive other types of mounting brackets such as Universal Slider Brackets™ manufactured by Sioux Chief Manufacturing Company, Inc. which are described in detail in U.S. Pat. Nos. 6,402,096 and 6,446,915.

Depending on the desired installation, the system 1 may be installed using various combinations of the mounting flanges 72 and nail guides 77, the U-shaped clips 26 and the mounting brackets 27 to interconnect the boxes 24 and 25 and to connect or mount the boxes 24 and 25 to one or more of the wall studs 11. If, for example, it is desired that the boxes 24 and 25 be located adjacent to and on opposite sides of a stud 11 as in FIG. 3, the boxes 24 and 25 are connected by a single U-shaped clip 26. One leg 81 of the clip 26 is inserted into the slot 84 associated with one of the side walls 29 of the supply box 24 and the other leg 81 is inserted in the slot 84 associated with one of the side walls 43 of the drain box 25. Note that because slots 84 are formed along each of the side walls 29 of the supply box 24 and along each of the side walls 43 of the drain box 25, the supply box 24 may be positioned either to the left or right of the drain box 25 and may be oriented with its supply line openings 37 and 39 directed either upwardly or downwardly.

Once the boxes 24 and 25 are connected, the U-shaped clip 26 is pushed over the stud 11 until the front plate 83 is seated against the stud 11. The system 1 is retained in position by driving fasteners into the stud 11 through the fastener receiving holes 73 in the mounting flanges 72 adjacent the stud 11, and through the fastener openings 91 in the clip front plate 83. Fasteners are driven through the associated nail guides 77 to secure the boxes 24 and 25 to the side of the stud 11 and help retain the system 1 in position. Elongate mounting brackets 27 may be threaded through aligned slots 101 and grooves 103 in the in the boxes 24 and 25 and fastened to the stud 11 to provide additional vertical rigidity for the system.

If it is desired that the boxes 24 and 25 be installed side-by-side and between a pair of studs 11a and 11b as generally shown in FIG. 15, the boxes 24 and 25 are first connected together in their desired relationship to one another by a U-shaped clip 26 in the manner described above. Mounting brackets 27, sized to span the gap between studs 11a and 11b, are inserted through the aligned slots 101 and grooves 103 located along the tops and bottoms of the boxes 24 and 25. The side wall 29 or 43 to be positioned adjacent or proximate the stud 11a (sidewall 29 is shown adjacent stud 11a in FIG. 15) can then be secured to the stud 11a by driving fasteners through the mounting flanges 72 and nail guide 77 aligned therewith. Fasteners are also driven through fastener openings in the elongate mounting brackets 27 to secure them to studs 11a and 11b. Alternatively a second clip 26 could be used to secure the box 24 or 25 to be positioned adjacent the stud 11a thereto. In such an application, one leg 81 of the second clip 26 would be inserted through the slot 84 in the sidewall 29 or 43 to be positioned adjacent the stud 11a and the second clip could then be positioned over the stud 11a and the front plate 83 fastened to the stud 11a.

It is also foreseen that one or more boxes 24 and 25 could be supported on mounting brackets 27 spanning the gap between two adjacent studs 11a and 11b without use of a clip 26 to connect either the supply box 24 or the drain box 25 to either stud 11a or 11b as shown in FIG. 16 with reference to an ice maker water supply box 24. Connection of the supply line 3 and drain line 5 to the hookups in boxes 24 and 25 suspended on brackets 27 between studs 11 will generally fix the horizontal position of the boxes 24 or 25. In addition, the installer can drive a screw through one of the exposed fastener receiving openings in the bracket 27 and into the portion of the slotted wall 102 extending therebehind to fix the horizontal position of the box 24 or 25 relative to the brackets 27.

Once the system 1 has been installed using one of the above methods and the associated plumbing including the drain line 7 and supply lines 11 are in place, the wallboard 10 can be installed over the studs 11 and generally flush with the front edges of the boxes 24 and 25. After the wallboard is finished, the cover plate 28 is installed to cover the edges of the wallboard and give the boxes 24 and 25 a smooth, finished appearance.

It is to be understood that while certain forms of the present invention have been illustrated and described herein, it is not to be limited to the specific forms or arrangement of parts described and shown. For example, it is foreseen that the supply box and the drain box could be connected together by a cross-member integrally molded with the supply box and the drain box to form an assembly formed as a single molded piece of plastic. The cross member would effectively replace the front plate 83 of clip 26 and provide the proper spacing between the drain and supply boxes and provide means for mounting the supply and drain boxes on opposite sides of a stud with the stud received between the boxes. Fastener receiving openings would preferably be formed in the cross member to facilitate connection of the boxes to the stud positioned therebetween.

It should also be understood that the design of the knockout or closure member 57 disclosed herein, including the offset location of the nipple 64 is not limited in application to laundry boxes, but may also be used to removably cover openings in other types of plumbing devices, including but not limited to: test plugs similar to the one disclosed in U.S. Pat. No. 6,769,291 and fittings such as shower drains, floor drains, closet flanges and the like. It should also be noted that the weakened ring 63 around the peripheral rim 60 need not connect the closure member 57 to a pipe stop, but may be connected to any suitable structure surrounding the opening which is being covered by the closure member.

As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed and desired to be secured by Letters Patent is as follows:

1. A breakaway closure member removably covering an opening formed in a plumbing device, the closure member comprising:
   a) a circular disc having a peripheral rim;
   b) a hollow nipple extending longitudinally outward from said circular disc along a nipple axis substantially parallel to and radially outwardly offset from a central axis normal to said circular disc; said hollow nipple extending in a position generally tangent to said peripheral rim; and
   c) an area of reduced thickness connecting said peripheral rim to a portion of the plumbing device surrounding the opening; wherein:
   d) radially compressing said hollow nipple will draw a portion of said peripheral rim radially inward, thereby forming a crack in a portion of said area of reduced thickness proximate to said nipple.

2. The breakaway closure member as in claim 1 wherein said peripheral rim includes an inner rim section extending inwardly from an inner surface of said circular disc and an outer rim section extending outwardly from an outer surface of said disc.

3. The breakaway closure member as in claim 2 wherein said region of reduced thickness connects said inner rim section to said portion of the plumbing device surrounding the opening.

4. The breakaway closure member as in claim 1 wherein said portion of the plumbing device surrounding the opening is a pipe stop extending into a collar for receiving a pipe.

\* \* \* \* \*